United States Patent
Hatanaka

[11] Patent Number: 5,694,773
[45] Date of Patent: Dec. 9, 1997

[54] CLOSED CYCLE GAS TURBINE ENGINE AND MECHANICAL SYSTEM DRIVEN THEREBY

[76] Inventor: Takefumi Hatanaka, 1-4-14, Midori-cho, Koganei-shi, Tokyo, Japan

[21] Appl. No.: 359,496

[22] Filed: Dec. 20, 1994

[30] Foreign Application Priority Data

Dec. 8, 1994 [JP] Japan ................................ 6-334690

[51] Int. Cl.$^6$ ................................................ F01K 25/00
[52] U.S. Cl. ................................................ 60/516; 60/202
[58] Field of Search .................... 60/516, 651, 671, 60/202, 203.1

[56] References Cited

U.S. PATENT DOCUMENTS

| | | | |
|---|---|---|---|
| 4,760,705 | 8/1988 | Yogev et al. | 60/651 |
| 4,788,824 | 12/1988 | Spurr et al. | 60/671 |
| 4,876,855 | 10/1989 | Yogev et al. | 60/651 |
| 5,369,947 | 12/1994 | Dummersdorf et al. | 60/39.02 |
| 5,474,747 | 12/1995 | Hayashi et al. | 422/177 |

*Primary Examiner*—Alfred Basichas
*Attorney, Agent, or Firm*—Jordan and Hamburg

[57] ABSTRACT

A closed cycle gas turbine engine has sealed therein a working medium, within a working chamber, a closed exhaust manifold, a gas recirculating path, and a plasma gas generator, with a turbine rotor rotating within the working chamber. High voltage pulses of very brief duration are periodically applied to the plasma gas generator, causing electrical discharges to form a plasma in said working medium, thereby producing high pressure motive gas. Resultant flows of high-pressure motive gas drive the turbine rotor, providing a high level of output power from the engine with no consumption of a fuel. The pressure of the motive gas is reduced in the closed exhaust manifold and recirculated to the motive gas generator through the gas recirculating path for next electrical discharge. The engine is suitable for driving a mechanism such as a vehicle, machine etc.

8 Claims, 4 Drawing Sheets

CLOSED CYCLE GAS TURBINE ENGINE AND MECHANICAL SYSTEM DRIVEN THEREBY

BACKGROUND OF THE INVENTION

1. Field of the Invention

The present invention relates to a next-generation engine, and specifically to a closed cycle gas turbine engine, and to a mechanical system in which such a turbine engine serves as the motive power source.

2. Description of the Related Art

In the prior art, various types of internal combustion engine and gas turbine engine have been utilized to provide power for driving motor vehicles, ships, aircraft etc. in the field of transportation, for driving electrical generators, and for driving bulldozers, hydraulic shovels etc. in the field of construction, with these engines in general consuming such fuel as gasoline, diesel oil, L.P. gas, etc. Such conventional types of engine have the disadvantage of requiring large amounts of fuel, and of generating considerable amounts of pollution by-products which cause deterioration to the world environment.

There have been proposals in the prior art (specifically, by Kreitmeier in U.S. Pat. No. 5,102,298) for various types of gas turbine engine, in each of which power is generated as a result of fuel combustion. However all of such prior art types of gas turbine engine have basic disadvantages which have prevented them from achieving practical utilization. One disadvantage is that of extreme complexity of the engine configuration, making it difficult to produce an engine which will be sufficiently compact, light in weight, and have a practicable manufacturing cost. Another disadvantage is that such prior art types of gas turbine generate considerable amounts of pollution by-products.

SUMMARY OF THE INVENTION

It is an objective of the present invention to overcome the problems of prior art types of engine by providing a closed cycle gas turbine engine, in which motive power is produced by repetitively producing short-duration electric arc discharges within a gaseous fluid which is referred to hereinafter as the electrical discharge working medium, with the constitution and pressure of the working medium being selected such that each electric arc discharge will result in generation of a plasma to produce a high pressure motive gas, with that pressure increase being arranged to drive a turbine rotor, and further whereby such a gas turbine engine can be made compact and light in weight, and will have a simple configuration to thereby ensure ease of manufacture.

It is a further objective of the present invention to provide a mechanical system in which such a gas turbine engine serves as the motive power source.

It is moreover an objective of the present invention to provide a gas turbine engine which does not consume a fuel and which does not emit any pollutants, and so will serve to protect the environment.

DESCRIPTION OF PREFERRED EMBODIMENTS

Figure 2:
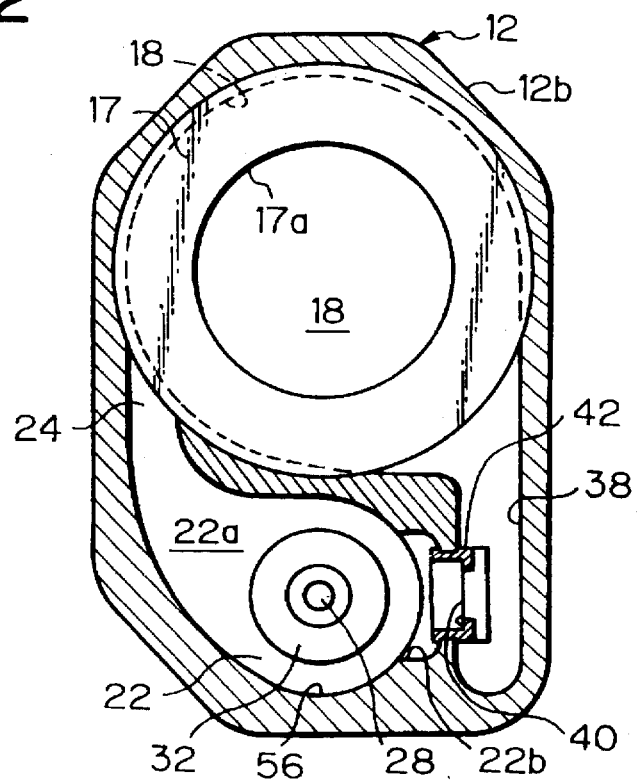
FIG. 2 is a cross-sectional view of the embodiment, taken on line II—II of FIG. 1.
Figure 3:
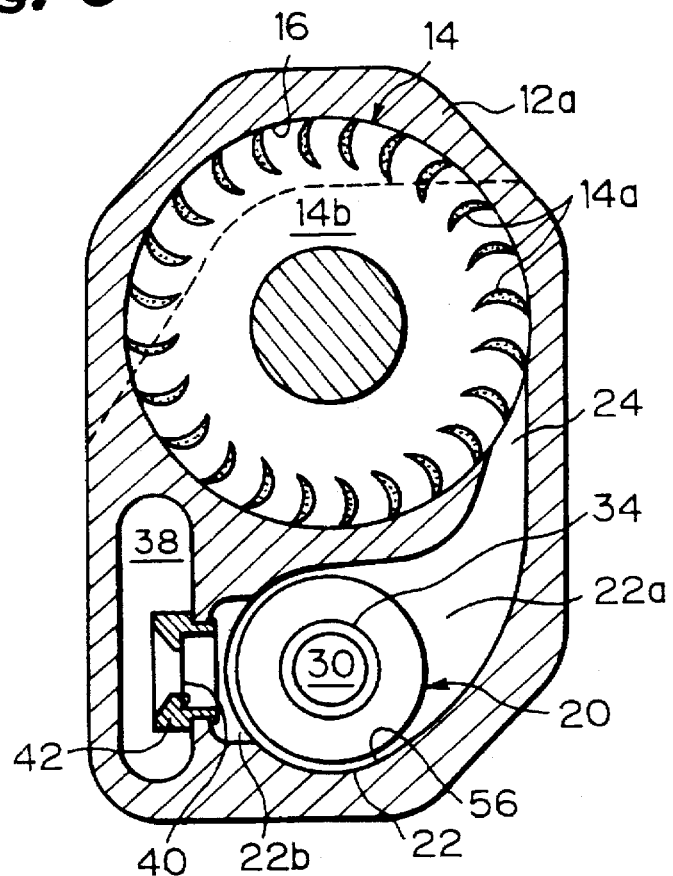
FIG. 3 is a cross-sectional view of the embodiment, taken on line III—III of FIG. 1.

A preferred embodiment of a closed cycle gas turbine engine according to the present invention will be described referring to FIGS. 1 to 3. The gas turbine engine 10 has a turbine casing 12 and a turbine rotor 14 supported by an output shaft 13. The turbine casing 12 comprises first and second casings 12a and 12b, and a side cover 12c. The first casing 12a has a cylindrical working chamber 18, in which the turbine rotor 14 forming part of a turbine 15 is rotatably received. The turbine rotor 14 has its outer periphery formed with a plurality of rotor blades 14a, and has a convex portion 14b formed at a position radially inwardly of the rotor blades 14a. A partition member 17 is sandwiched between the first and second casings 12a and 12b to form a part of the working chamber 16 and has an opening 17a. The turbine casing 12 has a closed exhaust manifold 18 and a plasma gas generator 20 provided on downstream and upstream of the turbine 15, respectively. The working chamber 16 communicates with the exhaust manifold 18 through the opening 17a of the partition member 17. The exhaust manifold 18 is formed in the second casing 12b.

The plasma gas generator 20 has an annular electric discharge chamber 22 which has an outlet 22a. The outlet 22a communicates with a turbine nozzle 24 oriented in the tangential line of the working chamber 16 and opening thereto. An electric discharge working medium is sealed at a pressure of 1 atmosphere ±5% within the working chamber 16, the exhaust manifold 18, the turbine nozzle 24 and the plasma gas generator 20. The plasma gas generator 20 has an electric discharge means 26 for periodically causing electric discharges, which produce intense ionization and formation of plasma in the working medium, thereby producing rapid increases in pressure. Resultant flows of high-pressure motive gas drive the turbine rotor. The discharge means 26 comprises an anode 28 and a cathode 30 mounted in both sides of the discharge chamber 22, the anode 28 and the cathode 30 being supported by suitable insulating materials 32, 34. Reference numeral 36 indicates a pressure plate to place the insulating material 34 in a fixed position. The electrodes 28 and 30 are coupled to receive periodic electric discharge signals from an electric discharge power source comprising a high frequency power source or a voltage pulse generating power source. In FIGS. 1 and 2, the turbine casing 12 has a gas recirculating path 38 for recirculating the motive gas entering the exhaust manifold 18 into the discharge chamber 22, and a lead valve 40 placed between an inlet 22b of the discharge chamber 22 and the gas recirculating path 38. The lead valve 40 is supported by a holder 42, which is mounted at the inlet 22b of the discharge chamber 22. The lead valve 40 serves as a check valve to recirculate the gas in the exhaust manifold 18 into the discharge chamber 22 during non-discharging time intervals and to close during discharging time intervals.

Figure 1:
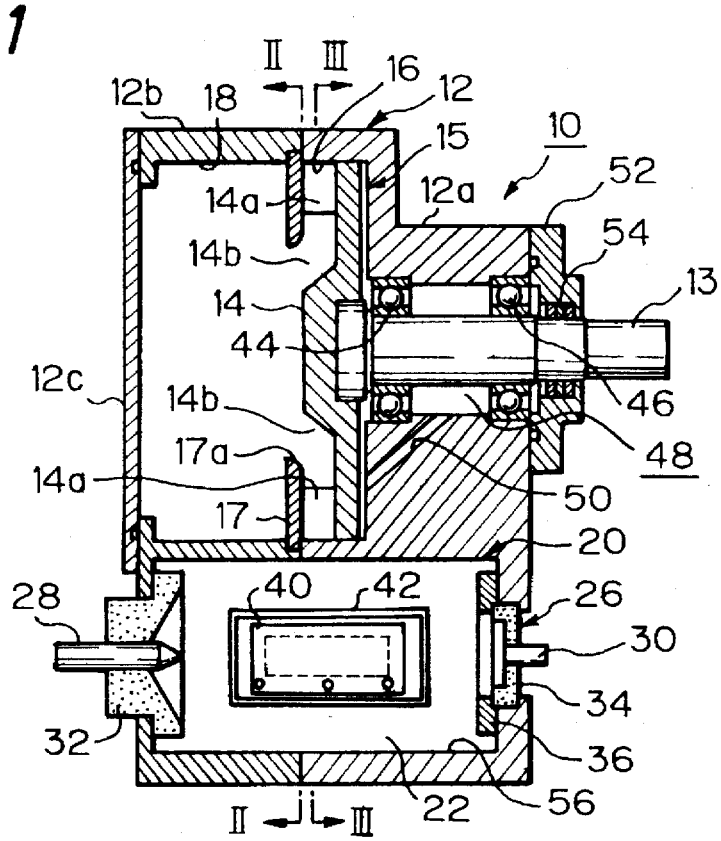
FIG. 1 is a partial cross-sectional view in elevation of a preferred embodiment of a gas turbine engine according to the present invention.

In the structure of FIG. 1, the side cover 12c may be removed from the second casing 12b, and a gas reservoir having a large volume may be coupled to the second casing 12b to increase the total effective volume of the exhaust manifold 18 to thereby improve the cooling efficiency. The output shaft 13 is supported by bearings 44, 46. The first casing 12a has a cavity 48 which communicates with the working chamber 16 through a port 50. A cover member 52 is fixed to the first casing 12a to support a seal 54. In FIGS. 1 to 3, the working chamber 16, the exhaust manifold 18, the gas recirculating path 38 and the plasma gas generator 20 serve as a closed system by which the motive gas periodically ejecting from the plasma gas generator 20 impinges upon the blades 14a of the turbine rotor 14 and, thereafter, the pressure of the motive gas is reduced in the closed exhaust manifold 18. Then the gas is recirculated into the discharge chamber 22 through the gas recirculating path 38 and the lead valve 40.

The internal surface of the electric discharge chamber 22 is covered by liner 56 formed of a radioactive material, or containing regions formed of a radioactive material. The resultant radioactive emissions into the electric discharge chamber 22 serve to enhance the degree of initial ionization of the working medium that occurs when a high voltage pulse is applied between the pairs of electrodes 28 and 30, thereby ensuring that each discharge will build up very rapidly, and also serving to increase the level of current flow through the working medium which occurs when ionization is initiated. As a result of the high ion density which is thereby rapidly achieved upon applying a high voltage pulse, generation of plasma within the working medium in the electric discharge chamber 22 in response to each high voltage pulse is accelerated, resulting in a very rapid increase in temperature and pressure within the electric discharge chamber 22 when a pulse is applied. The performance of the gas turbine engine is thereby enhanced by using such radioactive liner.

The liner 56, can for example be formed of thorium or polonium, although other types of radioactive material could also be used. In addition, so long as a suitable radioactive emission source is provided within the electric discharge chamber 22, it is not essential the each radioactive emission source be in the form of a continuously extending liner. However, preferably, the electric discharge chamber 22 should contain a radioactive emission source having an emission half-life of approximately ten years, with a radiation amount in the range 100 Bq to 1000 Bq, a radiation energy of no more than 0.7 MeV, and with only beta rays being emitted.

Such a source can be advantageously formed by preparing a solution of technium 99 in a suitable silicon based solvent, uniformly coating that solution over the interior surfaces of the electric discharge chamber 22, then allowing to dry. That is followed by heating in a nitrogen atmosphere to a temperature of 600° C. for one hour, whereby the technium 99 will be left uniformly distributed over the surface of the electric discharge chamber 22. Next, the same silicon based solvent is coated over that technium layer, and this is followed by heating to 600° C. within a vacuum, to thereby complete the formation of the radioactive liner 56. By using such liner 56 in the electric discharge chamber 22, highly stable electrical discharge characteristics can be obtained for the engine.

The points which must be considered in selecting a suitable material to be used as the electrical discharge working medium of this gas turbine engine embodiment will be described in the following, with specific examples being given.

EXAMPLE 1

The working medium comprises a mixture of a metallic vapor and an electrical discharge initiator gas, with the metallic vapor composed of mercury or sodium vapor and the electrical discharge initiator gas composed of a mixture of xenon, neon, krypton and helium or argon. In that case, the incorporation of the electrical discharge initiator gas will enable the necessary voltage amplitude for the pulses produced by the high voltage pulse generating source to be lowered, and will ensure that electrical arc discharges will be rapidly initiated within the working medium in a stable manner.

EXAMPLE 2

The working medium comprises an inert gas, such as helium, argon, xenon or neon, together with a material functioning as a radioactive emission source which emits alpha rays, beta rays, gamma rays, X-rays, etc. The radioactive emission source can for example be formed of krypton 85. The resultant radiation will produce excitation of electrons within the working medium, thereby improving the starting characteristics of the engine and enabling electrical discharges to be instantaneously initiated within the working medium, thereby improving the engine performance. From the aspect of safety, the amount of krypton 85 introduced into the working medium should be within the range of 0.2 to 50 microcuries/cm$^3$ of total volume of the electric discharge chamber 18 the working chamber 16 and the low pressure sections 26, 26'.

EXAMPLE 3

From considerations of preventing excessive increases in temperature within the working medium during electrical discharges, the working medium can advantageously comprises a mixture of gases with the volumetric proportions 36% helium, 26% neon, 17% argon, 13% krypton and 8% xenon, with that mixture being sealed in the engine at a pressure of 1 to 10 atmospheres, and preferably at 1 atmosphere ±5%.

EXAMPLE 4

The working medium comprises a mixture of noble gases in the respective volumetric ratios 40% to 60% argon, 30% to 40% xenon, and 6% to 8% neon. Other noble gases may be included.

EXAMPLE 5

The working medium comprises a mixture of noble gas selected from helium and argon, and a small amount of ketone.

EXAMPLE 6

The working medium comprises at least one of heavy hydrogen, thorium and hydrogen, mixed with at least one noble gas of helium or neon. When helium or neon is included in the working medium, recombination occurs during an electric discharge due to three-body collisions between pairs of heavy hydrogen (or hydrogen) atoms and helium or neon atoms, so that high efficiency can be achieved without a lowering of the density of the heavy hydrogen atoms.

EXAMPLE 7

The working medium comprises a mixture of at least one of the aforementioned noble gases with a substance having a molecular structure formed of carbon atoms, with the number of carbon atoms per molecule of that substance being in the range 60 to 200. Preferably, the substance is a $C_{60}$ or $C_{70}$ compound. The ionization potential of $C_{60}$, for example, is 7.5 eV, which is substantially lower than that of Xe, which is 12.1 eV. Thus, using such a substance enables the energy requirements for the discharge pulses to be greatly lowered.

EXAMPLE 8

The working medium comprises a mixture of fluorine or a fluorine compound (such as $NF_3$ or $SF_6$) with a noble gas such as helium, argon, neon, krypton, xenon.

EXAMPLE 9

The working medium comprises a mixture of chlorine or a chlorine compound (such as HCl, $BCl_2$ or $CCl_4$) with a noble gas such as helium, argon, neon, krypton, or xenon.

EXAMPLE 10

The working medium comprises a mixture of bromine or a bromine compound (such as $HBr_2$) with a noble gas such as helium, argon, neon, krypton, or xenon.

EXAMPLE 11

The working medium comprises a mixture of iodine or an iodine compound (such as HI) with a noble gas such as helium, argon, neon, krypton, or xenon.

The cathodes 30 preferably is formed from tungsten combined with thorium, in order to enhance the excitation of electrons within the working medium and thereby enhance ionization in the working medium. Alternatively, each cathode can comprise a sintered body, formed as a combination of powdered tungsten with an alkaline earth oxide type of thermal electron emission material, such as a mixture of barium oxide, strontium oxide and calcium oxide, together with zirconium oxide and/or scandium oxide. In particular, if zirconium oxide or scandium oxide is utilized, the rate of increase of the electrical conductivity of the cathode at high temperatures will be improved. As a result, the electric discharges will be stabilized.

As another example, the cathode 30 can be formed as a sintered electrode body, made by sintering a mixture of a metal base powder (for example, nickel with an alkaline earth metal oxide type of thermal electron emission material such as barium oxide, strontium oxide, or calcium oxide. The mixture proportions, by weight, should be 100 parts of metal powder to 10 parts of alkaline earth metal oxide. Such a sintered electrode has a large proportion of thermal electron emission material, but will be strong and capable of withstanding vibration and shock, and hence is advantageous in applications such as motor vehicles, ships, aircraft, bulldozers, etc.

As another example of a configuration for the cathodes 30 each can be formed by embedding chips of tantalum (which is highly ductile) in cavities formed in a ribbon-shaped electrode. By comparison with electrodes formed of tungsten, such a ribbon-shaped cathode has the advantage of having a reduced rate of surface abrasion due to ion collisions. When current flows through such a ribbon-shaped cathode, at a temperature in the order of 2000° to 2500° K, with a unidirectional potential difference being applied across the ends of the ribbon-shaped cathode, then thermal electrons are emitted from the tantalum chips. These electrons move towards the low-potential end of the ribbon.

Figure 4:
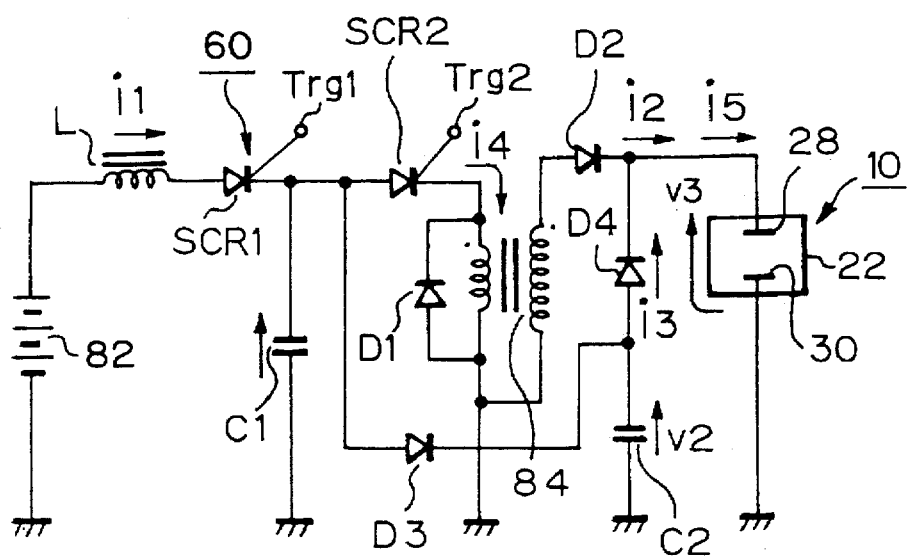
FIG. 4 is a circuit diagram of example of a high voltage pulse generating source, for use with the embodiment.
Figure 5:
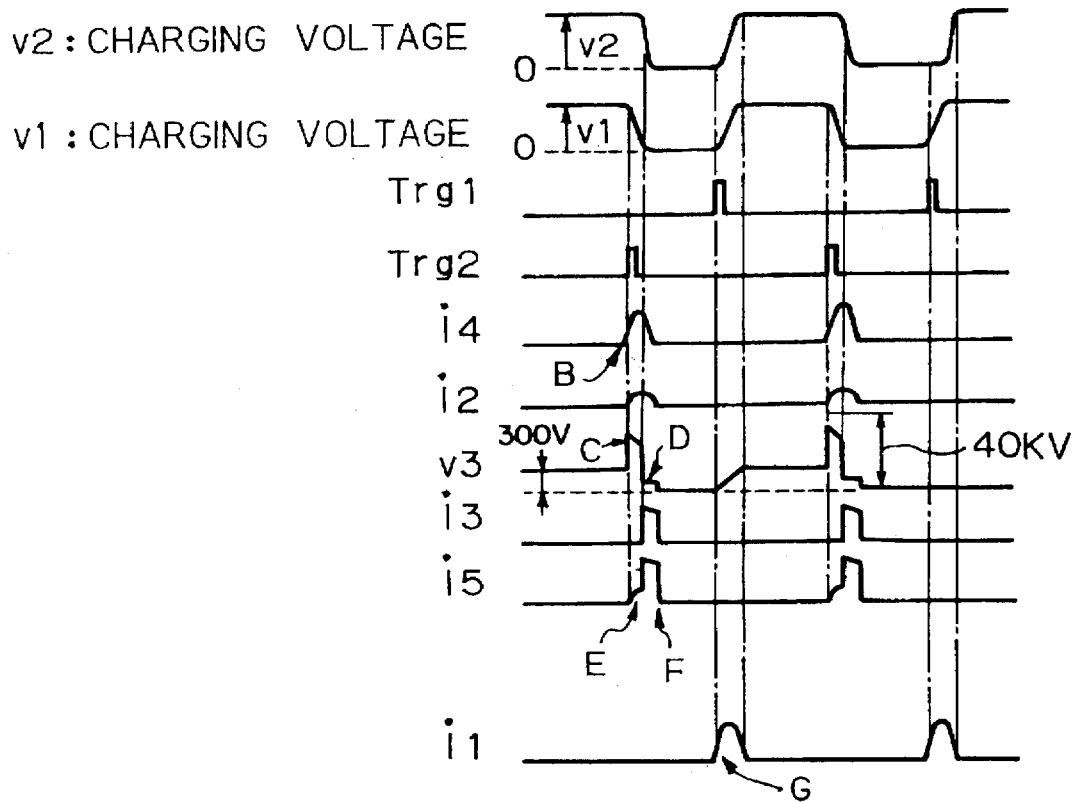
FIG. 5 shows waveform diagrams for describing the operation of the high voltage pulse generating source of FIG. 4.

FIG. 4 is a circuit diagram of an example of a suitable configuration for a high voltage pulse generating source to be used with the gas turbine engine 10, while FIG. 5 shows waveform diagrams for describing the operation of the circuit of FIG. 4. In FIG. 4, the electric discharge power source 60 comprises a high voltage pulse generating source, which comprises a DC source 82 such as batteries, a reactor L, a first switch means SCR1, a first capacitor C1 coupled to an output of the first switch means SCR1, a second switch means SCR2 and a high voltage trigger transformer 84. The transformer 84 has its primary winding whose one end is connected to the output of the second switch means SCR2 and whose another is connected to ground. Both ends of the primary winding of the transformer 84 are connected to each other through a diode D1. One end of a secondary winding of the transformer 84 is connected to ground and another end of the secondary winding is connected to the anode 28 of the turbine engine 10 through a diode D2 to supply a discharge trigger current of a high voltage and small current to the anode 28. The anode 28 is also coupled through a diode D4 to a second capacitor C2 to receive a main discharge current of a small voltage and large current. The joint between the diode D4 and the capacitor C2 is coupled through the diode D3 to the outputs of the first switch means SCR1 and the first capacitor C1. The end of the second capacitor C2 is connected to ground. The cathode 30 is connected to ground.

In the circuit of FIG. 4, when the first switch means SCR1 is switched ON in response to a trigger signal Trg1, the first and second capacitors C1, C2 are charged at a voltage of about 300 V by the output voltage of the battery 82. Under this circumstance, when the second switch means SCR2 is switched on in response to a trigger signal Trg2, the electric charge charged in the first capacitor C1 flows as current i4 into a primary side of a high voltage trigger transformer 84. In FIG. 5, B indicates the timing at which the second switch means SCR2 is switched on and the first capacitor C1 begins to discharge. The primary side of the high voltage trigger transformer 84 is applied with the peak voltage pulse of 300 V and the secondary side of the transformer 84 generates an output voltage pulse V3 of about 40 KV having a duration in the range of several microseconds to several tens of microseconds, with the voltage pulse being applied to the anode 28 of the turbine engine 10. In FIG. 5, C indicates the high voltage pulse V3 to be applied to the anode 28, while D indicates the voltage level at the peak timing of the discharge. If the conductivity rapidly increases when the gas in the engine 10 goes into plasma state, the voltage V3 rapidly drops to about 100 V because of negative resistance of the discharge phenomenon. At this instant, when the discharge voltage drops below the voltage V2 of about 300 V charged in the second capacitor C2, a large electric current i5 flows into the anode 28 from the second capacitor C2 and the discharge voltage further drops until the electric discharge of the second capacitor C2 is completely discharged and the flow of the electric current i5 ceases. In FIG. 5, E indicates the timing in which the gas in the engine 10 goes into the plasma state and the second capacitor C2 begins to discharge the large electric current. F indicates the timing at which the electric discharge finishes. After the electric discharge is completed, the first switch means SCR1 is switched on in response to the trigger signal Trg1. The electric current i1 flows in a sinewave, to thereby charge the first and second capacitors C1, C2. The first and second capacitors C1, C2 are charged to a voltage of about 300 V higher than that of the battery 82 in response to a reaction voltage due to the inductance of the reactor L. When flows of the electric current i1 is stopped, the charging of the first and second capacitors C1, C2 ceases. In FIG. 5, G indicates the state in which the first switch means SCR1 is switched on and the first and second capacitors C1, C2 are charged by the electric current i1. In this fashion, the high voltage transformer 84 serves as a discharge trigger power source of the high voltage with the small electric current, while the second capacitor C2 serves as a main discharge power source of the low voltage with the large electric current. The main discharge power source can provide the large flow of electric current of 1000 to 3000 A by a single battery of 12 V and the pressure increase in the engine 10 rapidly occurs to increase the engine output.

With the construction described above, high voltage pulses V3 are periodically applied between the electrodes 28 and 30, to thereby produce arc discharges within the working medium to form plasma therein. The plasma formation causes periodic rapid increases in pressure within the plasma gas generator 26, causing a flow of the working medium to impinge on the blades 14a of the turbine rotor 14 in a direction such as to apply rotational force to the turbine rotor 14. In the intervals between the electrical discharges, the working medium in the plasma gas generator 20, the working chamber 16 and the exhaust manifold 18 cools and contracts, so that the pressure within the plasma gas generator 20 falls and the working medium in the exhaust manifold 18 flows back into the plasma gas generator 20, prior to application of the next high voltage pulse to the electrodes.

Since each pulse, and hence each interval of plasma formation, can be of very brief duration (e.g. a few microseconds) only a moderate increase in the average temperature of the working medium will occur during continuous operation of the engine.

Figure 6:
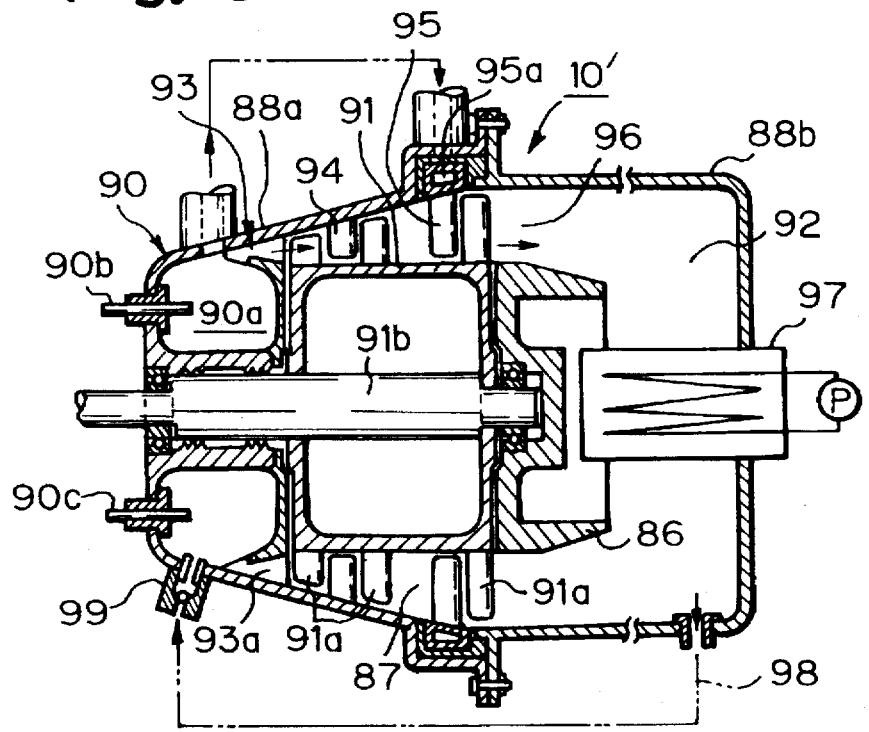
FIG. 6 is a cross sectional view of another preferred embodiment of a gas turbine engine according to the present invention.

FIG. 6 shows another preferred embodiment of a closed cycle gas turbine engine. The gas turbine engine 10' is of an axial flow type, and has annular turbine casings 88a, 88b having their intermediate portion provided with a turbine. The casing 88a has its forward end formed with a plasma gas generator 90, and a working chamber 87 in which a turbine rotor 91 is located at downstream side of an outlet of the plasma gas generator 90 and is rotatably mounted on an output shaft 91b. The casing 88b has an annular shape to form a closed exhaust manifold 92 communicating within an outlet 96 of the working chamber 87. A working medium is sealed in the plasma gas generator 90, the working chamber 87 and the exhaust manifold 92. The plasma gas generator 90 has an annular discharge chamber 90a formed at upstream side of the turbine, and electric discharge means constituted by electrodes 90b, 90c mounted therein. The electric discharge means is applied with periodic high voltage pulses of the type mentioned above. The casing 88a has its periphery formed with a turbine nozzle 93 composed of a plurality of stator nozzle blades 93a. The turbine rotor 91 has its outer periphery formed with a plurality of stages of rotor blades 91a. The turbine nozzle 93 serves to direct the flow of the motive gas toward the rotor blades 91a. The casing 88a has a plurality of stages of stator blades 94, 95, with the stator blade 95 having a heating medium passage 95a communicating with the discharge chamber 90a to circulate the high-temperature motive gas in the passage 95a to heat up the motive gas passing through the stator blade 95.

The high-temperature and high-pressure motive gas generated in the discharge chamber 90a flows through the turbine nozzle 93 and impinges upon the rotor blades 91a to provide a rotational drive force to the turbine rotor 91. Since the stator blade 95 is heated up to a high temperature by the high-temperature motive gas flowing into the passage 95a, the motive gas flowing through the stator blade 95 is rapidly heated to thereby increase the pressure of the motive gas which impinges upon the rear stage of the rotor blade 91a. The motive gas then flows through an exhaust opening 96 into the closed exhaust manifold 92. Thus, the motive gas cools due to a cooling means 97 and contracts, so that the pressure of the motive gas in the closed exhaust manifold 92 falls, since, at the same time, the pressure of the working medium in the discharge chamber 90a further falls, the cooled gas in the closed exhaust manifold 92 flows back into the discharge chamber 90a through a gas recirculating pipe 98 and is used again for next arc discharge. A stationary bearing holder 86 is connected to the casing 88b by some suitable means (not shown).

Figure 7:
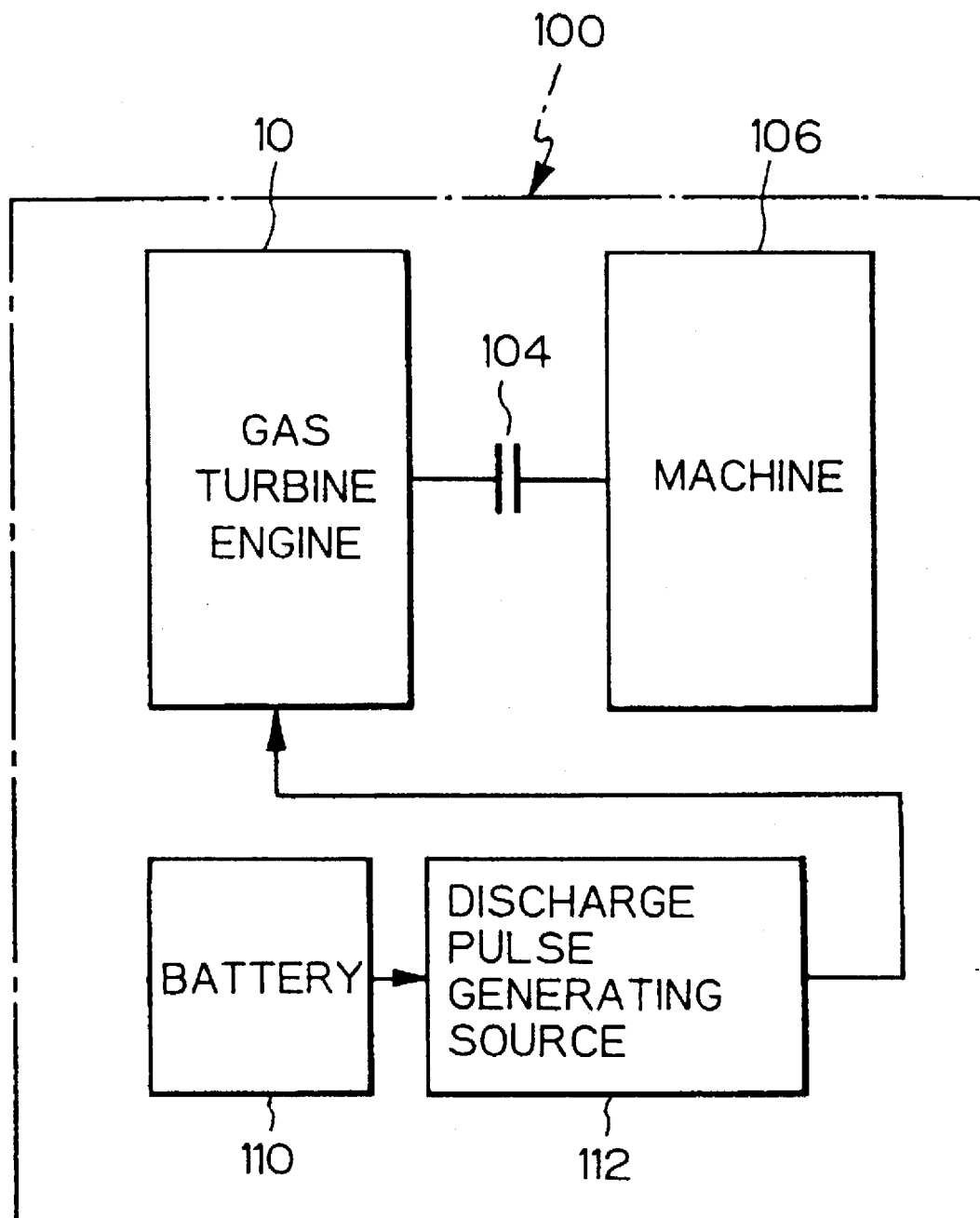
FIG. 7 is a simple block diagram of a mechanical system according to the present invention which is powered by a gas turbine engine.

FIG. 7 is a simple block diagram of an embodiment of a mechanical system which incorporates the gas turbine engine described above. The system 100 comprises the gas turbine engine 10 of the type shown in FIGS. 1 to 3 and FIG. 6, a machine 106 which is driven by the engine 10, a coupling device 104 for transferring power from the engine 10 to the machine 106, a battery 110 to store the DC output, and an electric discharge power source 112 connected to the battery 110 to supply periodic electric discharge pulses to the engine 10. The machine 106 can be of various different types, for example a vehicle such as an automobile, truck, bus, train, bulldozer, two-wheeled vehicle, ship, or aircraft; a flow-producing device such as a fan, blower, pump, or compressor; a refrigerator or air conditioner; construction equipment such as a hydraulic shovel; plastic forming equipment or rubber forming equipment; industrial equipment such as material handling equipment, press machine, woodworking machine, machine tool, metal working machine, etc.; transporting equipment such as an elevator, escalator, winding machine, crane, winch, belt conveyer, etc; agricultural equipment such as a combine harvester, tomato harvester, tractor, etc.; fisheries equipment such as a net winch, etc.; mining equipment such as a boring drill or crushing ill; food processing equipment such as a flour mill, mixing machine, etc.; textile machinery such as weaving looms, etc.; chemical equipment such as agitators; printing equipment, etc.

It should be noted that although the above embodiment has been described on the assumption that plasma is created within the working medium as a result of periodic electrical discharges which are generated between pairs of electrodes, it would be equally possible to utilize a microwave generator which is arranged such as to periodically inject microwaves into the electric discharge chamber, and thereby effect electrical discharges for producing plasma in the working medium.

Although omitted from the drawings, the above embodiment is preferably further provided with a cooling system including a cooling jacket which covers at least a part of the outer surface of the casing, and which is connected to a device for passing a flow of cooling fluid through the cooling jacket. Such a cooling jacket will assist in ensuring that sufficiently rapid cooling of the working medium will occur during the intervals between electrical discharges in the pressure increase sections. Since such engine cooling systems are very well known, description is omitted.

Alternatively, a sufficient degree of cooling may be achieved by providing a plurality of cooling fins which extend from the outer surface of the casing, for air cooling of the engine, for example in conjunction with an external fan.

With the embodiment described above, a single turbine rotor is used. However it would also be possible to provide an adjacent pair of such turbine rotors, each coaxially attached to the output shaft, and separated by a partition plate, with additional electric high pressure gas generator being provided for the additional turbine rotor. In that case, by orienting the blades of the second turbine rotor at an opposite angle to those of the first turbine rotor, it becomes possible to provide a reversible engine.

The gas turbine engine of the present invention can have a long operating life-time, and has the advantages of not requiring the consumption of any fuel, such as gasoline. In addition, such an engine provides the advantage of compact size combined with a high level of output power, while the configuration of the engine can be extremely simple, with only a small number of components. Such a gas turbine engine can be light in weight, and extremely smooth and quiet in operation. Since a plurality of high voltage pulses are supplied to the electrodes during each revolution of the engine output shaft, the level of vibration can be extremely small, and the manufacturing cost and maintenance cost can be very low.

Since the working medium can be used permanently after having been sealed within the housing, it becomes unnecessary to supply any additional material or fuel to the engine from the exterior, throughout a long period of operation.

Moreover, since no exhaust gases are generated by such an engine, the problem of air pollution is completely eliminated, so that further destruction of the world environment can be prevented. Hence, the effects provided by such an engine are extremely important.

What is claimed is:

1. A closed cycle gas turbine engine having sealed therein an electric discharge working medium, comprising:
    a plasma gas generator including electric discharge means for periodically producing an electric discharge to form a plasma in said working medium in said plasma gas generator to thereby periodically generate a high-pressure motive gas;
    a turbine casing having a working chamber, nozzle means opening to said working chamber and communicating with said plasma gas generator to eject said motive gas into said working chamber, and a closed exhaust manifold communicating with said working chamber; and
    a turbine rotor rotatably disposed in said working chamber and including a plurality of blades on which said motive gas impinges;
    said motive gas being reduced in pressure in said exhaust manifold and recirculated into said motive gas generator for next electric discharge.

2. A closed cycle gas turbine engine according to claim 1, in which said plasma gas generator is formed at upstream side of said turbine rotor.

3. A closed cycle gas turbine engine according to claim 2, further comprising gas recirculating means provided between said exhaust manifold and said plasma gas generator.

4. A closed cycle gas turbine engine according to claim 3, in which said gas recirculating means comprises means for periodically recirculating said motive gas to said plasma gas generator from said exhaust manifold.

5. A closed cycle gas turbine engine according to claim 1, in which said plasma gas generator comprises an annular discharge chamber formed adjacent said working chamber.

6. A closed cycle gas turbine engine according to claim 1, in which said nozzle means comprises a turbine nozzle composed of a plurality of nozzle blades formed on an inner periphery of said turbine casing at a position upstream side of said turbine rotor and in which said motive gas flows in an axial direction of said turbine rotor.

7. A closed cycle gas turbine engine according to claim 1, in which said exhaust manifold has cooling means to cool said motive gas.

8. A mechanical system comprising:
    a machine; and
    a gas turbine engine drivably connected to said machine and having sealed therein an electric discharge working medium;
    said gas turbine engine including a plasma gas generator including electric discharge means for periodically producing an electric discharge to form a plasma in said working medium in said plasma gas generator to thereby periodically generate a high-pressure motive gas;
    a turbine casing having a working chamber, nozzle means opening to said working chamber and communicating with said plasma gas generator to eject said motive gas into said working chamber, and a closed exhaust manifold communicating with said working chamber; and
    a turbine rotor rotatably disposed in said working chamber and including a plurality of blades on which said motive gas impinges;
    said motive gas being reduced in pressure in said exhaust manifold and recirculated into said plasma gas generator for next electric discharge.

* * * * *